(12) United States Patent
Yoshimura

(10) Patent No.: US 6,477,547 B1
(45) Date of Patent: Nov. 5, 2002

(54) PROCESSING SYSTEM COMPRISED OF DATA PROCESSING DEVICE AND DATA ACCESS DEVICE EACH CONVERTING DATA AND MUTUALLY COMMUNICATING THE CONVERTED DATA

(75) Inventor: Yoshimasa Yoshimura, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/400,186

(22) Filed: Sep. 21, 1999

(30) Foreign Application Priority Data

Apr. 1, 1999 (JP) .......................................... 11-094771

(51) Int. Cl.$^7$ .............................................. G06F 17/30
(52) U.S. Cl. ............................... 707/203; 707/2; 707/9; 380/239
(58) Field of Search ................................ 707/203, 2, 9; 705/68; 380/204, 239; 713/165, 194, 167, 189

(56) References Cited

U.S. PATENT DOCUMENTS 5,544,086 A * 8/1996 Davis et al. ................... 705/68
5,559,887 A * 9/1996 Davis et al. ................... 705/68

FOREIGN PATENT DOCUMENTS

JP          61043376          3/1986

* cited by examiner

Primary Examiner—Hosain T. Alam
Assistant Examiner—Jean Bolte Fleurantin
(74) Attorney, Agent, or Firm—McDermott, Will & Emery

(57) ABSTRACT

There is provided a processing system capable of preventing third parties from improper operation. Referring to FIG. 4, a storage device generates a pseudo random number (key data k), calculates a value g (k) of a function g, rearranges each bit of the key data k and value g (k) in accordance with a predetermined method, transmits them to a terminal device, and calculates a value f (k) of a function f. The terminal device receives data and calculates a value g (k). The terminal device compares the value g (k) received from the storage device and the value g (k) calculated by the terminal device. If the values do not match, access to the storage device is stopped. If the values match, the terminal device calculates and transmits value f (k) to the storage device. The storage device compares the value f (k) calculated by the storage device and the value f (k) received from the terminal device and responds to a result of the comparison by determining whether to permit access from the terminal device.

17 Claims, 10 Drawing Sheets

PROCESSING SYSTEM COMPRISED OF DATA PROCESSING DEVICE AND DATA ACCESS DEVICE EACH CONVERTING DATA AND MUTUALLY COMMUNICATING THE CONVERTED DATA

BACKGROUND OF THE INVENTION

1. Field of the Invention

The present invention relates to processing systems comprised of a data processing device and a data access device, and data processing and data access devices used in processing systems. The present invention relates particularly to processing systems comprised of data processing and data access devices capable of preventing improper access, and data processing and data access devices used in processing systems capable of preventing improper access.

2. Description of the Background Art

A hard disk device and a PC card ATA (Personal Computer Card Advance Technology Attachment) which are used in a terminal device such as a notebook-type personal computer can readily be removed from the terminal device and thus often used for carrying data. However, the data stored therein can be improperly stolen or changed by a third party and they are thus not suitable for storing classified information. Thus it is essential for such storage devices to have a mechanism which protects the security of data. It is also important for IC (Integrated Circuit) cards to have a data security protection mechanism.

Japanese Patent Laying-Open No. 61-43376 discloses a method of virtual authentication between an IC card and a device that can prevent a third party, e.g., from improperly stealing or changing the data stored therein. Referring to FIG. 11, an IC card 62 and a device 60, which communicate data mutually, each have system-specific functions F1 and F2. Device 60 and IC card 62 generate random numbers a1 and a2, respectively, and transmit their respective random numbers to each other. Device 60 and IC card 62 each use random numbers a1 and a2 as arguments to calculate values F1 (a1, a2) and F2 (a1, a2) of the respective functions F1 and F2. Device 60 transmits value F2 (a1, a2) to IC card 62. IC card 62 compares the received value F2 (a1, a2) with a value F2 (a1, a2) calculated by IC card 62 and, if the values are equal, regards device 60 as a regular device. When IC card 62 recognizes device 60 as a regular device, IC card 62 transmits value F1 (a1, a2) to device 60. Device 60 compares the received value F1 (a1, a2) with a value F1 (a1, a2) calculated by device 60 and, if the values are equal, regards IC card 62 as a regular card and issues to IC card 62 a command for access. Once the command for access has been issued, device 60 and IC card 62 mutually communicate data, as desired. Device 60 and IC card 62 having common functions and comparing values of the functions thus allow device 60 to determine whether card 62 is a regular card and card 62 to determine whether device 60 is a regular device.

However, if a third party could improperly steal data communicated between regular device 60 and regular IC card 62, the third party can obtain random numbers a1 and a2 and values F1 (a1, a2) and F2 (a1, a2) of functions F1 and F2. Thus the third party can construct a false device 60 to improperly steal data of IC card 62.

It should also be noted that if possible values of random numbers a1 and a2 can widely range and such a round-robin system as mentioned above cannot be carried out in a reasonable time, a portion of data can be used to conjecture function F2. Thus a third party can construct a false device 60 which outputs value F2 (a1, a2) of function F2 so that IC card 62 regards false device 60 as a regular device. Thus the third party can improperly steal data stored in IC card 62.

SUMMARY OF THE INVENTION

The present invention has been made to overcome the above disadvantages.

One object of the present invention is to provide a processing system capable of preventing third parties from carrying out improper processings.

Another object of the present invention is to provide a processing system capable of preventing third parties from carrying out improper processings if the third parties could improperly steal data communicated between devices.

Still another object of the present invention is to provide a data processing device used in a processing system that can prevent third parties from carrying out improper processings.

Still another object of the present invention is to provide a data processing device used in a processing system that can prevent third parties from carrying out improper processings if the third parties could improperly steal data communicated between devices.

Still another object of the present invention is to provide a data access device used in a processing system that can prevent third parties from carrying out improper processings.

Still another object of the present invention is to provide a data access device used in a processing system that can prevent third parties from carrying out improper processings if the third parties could improperly steal data communicated between devices.

In one aspect of the present invention, a processing system includes a data processing device and a data access device which are mutually connected to implement a predetermined function. The data processing device includes a data select unit disposed to select data, a first conversion unit connected to the data select unit to convert selected data according to a predetermined method, a first transmission unit connected to the first conversion unit to transmit converted data to the data access device, a first reception unit receiving data from the data access device, a second conversion unit connected to the data select unit to convert the selected data according to a predetermined method, and a first operation determining unit connected to the first reception unit and the second conversion unit to compare outputs from the first reception unit and the second conversion unit and respond to a result of the comparison between the outputs from the first reception unit and the second conversion unit by determining an operation of the data processing device. The data access device includes a second reception unit connected to the first transmission unit to receive an output from the first transmission unit, a third conversion unit connected to the second reception unit to convert an output from the second reception unit in accordance with a predetermined method, a first comparator unit connected to the second reception unit and the third conversion unit to compare an output from the third conversion unit and data defined by the output from the second reception unit, a fourth conversion unit connected to the second reception unit to convert the output from the second reception unit in accordance with a predetermined method, and a second operation determining unit connected to the first comparator unit and the fourth conversion unit and respond to a result of the comparison by determining an operation of the data access device and transmitting an output from the fourth conversion unit to the data processing device.

A third party who has obtained a relationship between selected data and the output from the fourth conversion unit that is transmitted from the second operation determining unit may improperly construct a false data access device which can transmit to the data processing device the data identical to the output from the fourth conversion unit associated with the selected data once the false device has received the selected data. Thus the third party may improperly combine the false data access device with the regular data processing device to implement a predetermined function. For example, if the data processing device is a storage device the third party may improperly steal data stored in the storage device. In effect, however, the selected data is previously converted by the first conversion unit before it is transmitted to the data access device. Thus, if the third party could improperly steal communication between the data processing device and the data access device, the party could hardly extract only the selected data. Thus the third party cannot engage the processing system of interest in implementing the predetermined function.

Furthermore, a third party who has obtained a relationship between the data converted by the first conversion unit and the output from the fourth conversion unit may improperly construct a false data access device which can transmit to the data processing device the data identical to the output from the fourth conversion unit associated with the converted data from the first conversion unit once the false device has received the converted data from the first conversion unit. Thus the third party may improperly combine the false data access device with the regular data processing device to implement a predetermined function. In effect, however, a bit length of the data converted by the first conversion unit is an item classified between the data processing device and the data access device. Thus the third party cannot obtain the bit length of the data converted by the first conversion unit, so that the party cannot obtain the possible number taken by the converted data. Thus the third party could not find how many combinations of the converted data from the first conversion unit and the output from the fourth conversion unit should be extracted and will thus continue to take data endlessly. Thus the third party can hardly obtain such combinations properly, so that the party cannot engage the processing system of interest in implementing the predetermined function.

Thus the third party cannot exploit the processing system to carry out improper processings.

Preferably, the first conversion unit includes a fifth conversion unit connected to the data select unit to convert selected data in accordance with a first predetermined method and a sixth conversion unit connected to the data select unit and the fifth conversion unit to convert outputs from the data select unit and the fifth conversion unit in accordance with a predetermined conversion method, the third conversion unit includes a seventh conversion unit connected to the second reception unit to extract selected data from the output of the second reception unit and convert the selected data in accordance with the first method, and the first comparator unit includes a second compactor unit connected to the second reception unit and the seventh conversion unit to extract from the output of the second reception unit the data converted according to the first method and compare the extracted data with an output from the seventh conversion unit.

Still preferably, the sixth conversion unit includes a conversion rearrangement unit connected to the data select unit and the fifth conversion unit to rearrange each bit of the outputs from the data select unit and the fifth conversion unit in accordance with a predetermined rearrangement method.

In another aspect of the present invention, a data processing device is used in a processing system including a data processing device and a data access device which are interconnected to implement a predetermined function. The data processing device includes a data select unit disposed to select data, a first conversion unit connected to the data select unit to convert selected data in accordance with a predetermined method, a first transmission unit connected to the first conversion unit to transmit converted data to the data access device, a first reception unit receiving data from the data access device, a second conversion unit connected to the data select unit to convert the selected data in accordance with a predetermined method, and a first operation determining unit connected to the first reception unit and the second conversion unit to compare outputs from the first reception unit and the second conversion unit and respond to a result of the comparison by determining an operation of the data processing device.

A third party who has obtained a relationship between selected data and data transmitted from the data access device may improperly construct a false data access device which can transmit to the data processing device the data identical to the data transmitted from the data access device associated with the selected data once the false device has received the selected data. Thus the third party may improperly combine the false data access device with the regular data processing device to implement a predetermined function. For example, if the data processing device is a storage device the third party may improperly steal data stored in the storage device. In effect, however, the selected data is previously converted by the first conversion unit before it is transmitted to the data access device. Thus, if the third party could improperly steal communication between the data processing device and the data access device, the party could hardly extract only the selected data. Thus the third party cannot engage the processing system of interest in implementing the predetermined function.

Furthermore, a third party who has obtained a relationship between the data converted by the first conversion unit and data transmitted from the data access device may improperly construct a false data access device which can transmit to the data processing device the data identical to the data transmitted from the data access device associated with the converted data from the first conversion unit once the false device has received the converted data from the first conversion unit. Thus the third party may improperly combine the false data access device with the regular data processing device to implement a predetermined function. In effect, however, a bit length of the data converted by the first conversion unit is an item classified between the data processing device and the data access device. Thus the third party cannot obtain the bit length of the converted data from the first conversion unit, so that the party cannot obtain the possible number taken by the converted data. Thus the third party could not find how many combinations of the converted data from the first conversion unit and the data transmitted from the data access device should be extracted and will thus continue to take data endlessly. Thus the third party can hardly obtain such combinations properly, so that the party cannot engage the processing system of interest in implementing the predetermined function.

The data transmitted from the data access device to the data processing device is comprised of selected data and data converted based on the selected data, with each bit rearranged. Thus the third party could hardly extract the selected data from the rearranged data. Thus the third party could hardly construct a false data access device nor exploit the system of interest to implement improper processings.

Still preferably, the sixth conversion unit includes an enciphering unit connected to the data select unit and the fifth conversion unit to encipher the outputs from the data select unit and the fifth conversion unit and the second reception unit includes a reception and deciphering unit connected to the first transmission unit to receive and decipher the output from the first transmission unit.

Data transmitted from the data access device to the data processing device is comprised of the selected data and data converted based on the selected data that are enciphered. Thus third parties could hardly extract the selected data from the enciphered data. Thus the third parties could hardly construct a false data access device nor exploit the processing system of interest to implement improper processings.

In still another aspect of the present invention, a data access device is used in a processing system comprised of: a data processing device including a data select unit disposed to select data, a first conversion unit connected to the data select unit to convert selected data in accordance with a predetermined method, a first transmission unit connected to the first conversion unit to transmit converted data to a data access device, a first reception unit receiving data from the data access device, a second conversion unit connected to the data select unit to convert selected data in accordance with a predetermined method, and a first operation determining unit connected to the first reception unit and the second conversion unit to compare outputs from the first reception unit and the second conversion unit and respond to a result of the comparison by determining an operation of the data processing device; and a data access device interconnected to the data processing device to implement a predetermined function. The data access device includes a second reception unit connected to the first transmission unit to receive an output from the first transmission unit, a third conversion unit connected to the second reception unit to convert an output from the second reception unit in accordance with a predetermined method, a first comparator unit connected to the second reception unit and the third conversion unit to compare an output from the third conversion unit and data defined by the output from the second reception unit, a fourth conversion unit connected to the second reception unit to convert the output from the second reception unit in accordance with a predetermined method, and a second operation determining unit connected to the first comparator unit and the fourth conversion unit and responding to a result of the comparison by determining an operation of the data access device to transmit an output from the fourth conversion unit to the data processing device.

A third party who has obtained a relationship between selected data and the output from the fourth conversion unit that is transmitted from the second operation determining unit may improperly construct a false data access device which can transmit to the data processing device the data identical to the output from the fourth conversion unit associated with the selected data once the false device has received the selected data. Thus the third party may improperly combine the false data access device with the regular data processing device to implement a predetermined function. For example, if the data processing device is a storage device the third party may improperly steal data stored in the storage device. In effect, however, the selected data is previously converted by the first conversion unit before it is transmitted to the data access device. Thus, if the third party could improperly steal communication between the data processing device and the data access device, the third party could hardly extract only the selected data. Thus the third party cannot engage the processing system of interest in implementing the predetermined function.

Furthermore, a third party who has obtained a relationship between the data converted by the first conversion unit and the output from the fourth conversion unit may improperly construct a false data access device which can transmit to the data processing device the data identical to the output from the fourth conversion unit associated with the converted data from the first conversion unit once the false device has received the converted data from the first conversion unit. Thus the third party may improperly combine the false data access device with the regular data processing device to implement a predetermined function. In effect, however, a bit length of the data converted by the first conversion unit is an item classified between the data processing device and the data access device. Thus the third party cannot obtain the bit length of the data converted by the first conversion unit, so that the party cannot obtain the possible number taken by the converted data. Thus the third party could not find how many combinations of the converted data from the first conversion unit and the output from the fourth conversion unit should be extracted and will thus continue to take data endlessly. Thus the third party could hardly obtain such combinations properly, so that the party cannot engage the processing system of interest in implementing the predetermined function.

Thus the third party cannot exploit the processing system to carry out improper processings.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
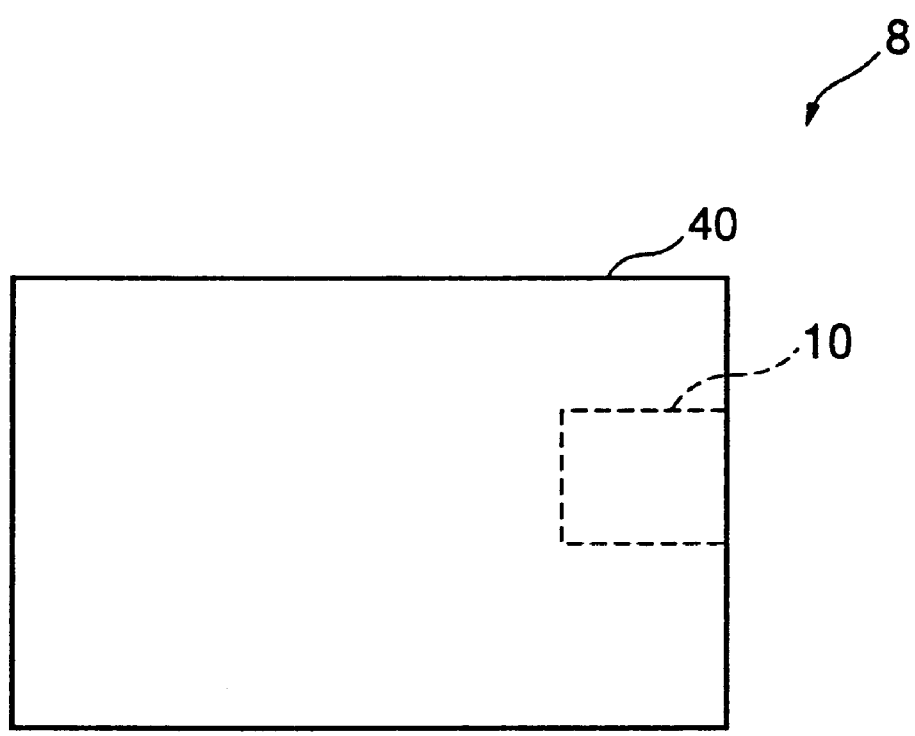
FIG. 1 schematically shows a card-type storage system 8 according to a first embodiment of the present invention.

Referring to FIG. 1, a card-type storage system 8 according to the first embodiment includes a terminal device 40 for writing and reading data to and from a card-type data storage device 10 described herein after and vice versa, and card-type data storage device 10 mounted internal to terminal device 40 for data storage.

Figure 2:
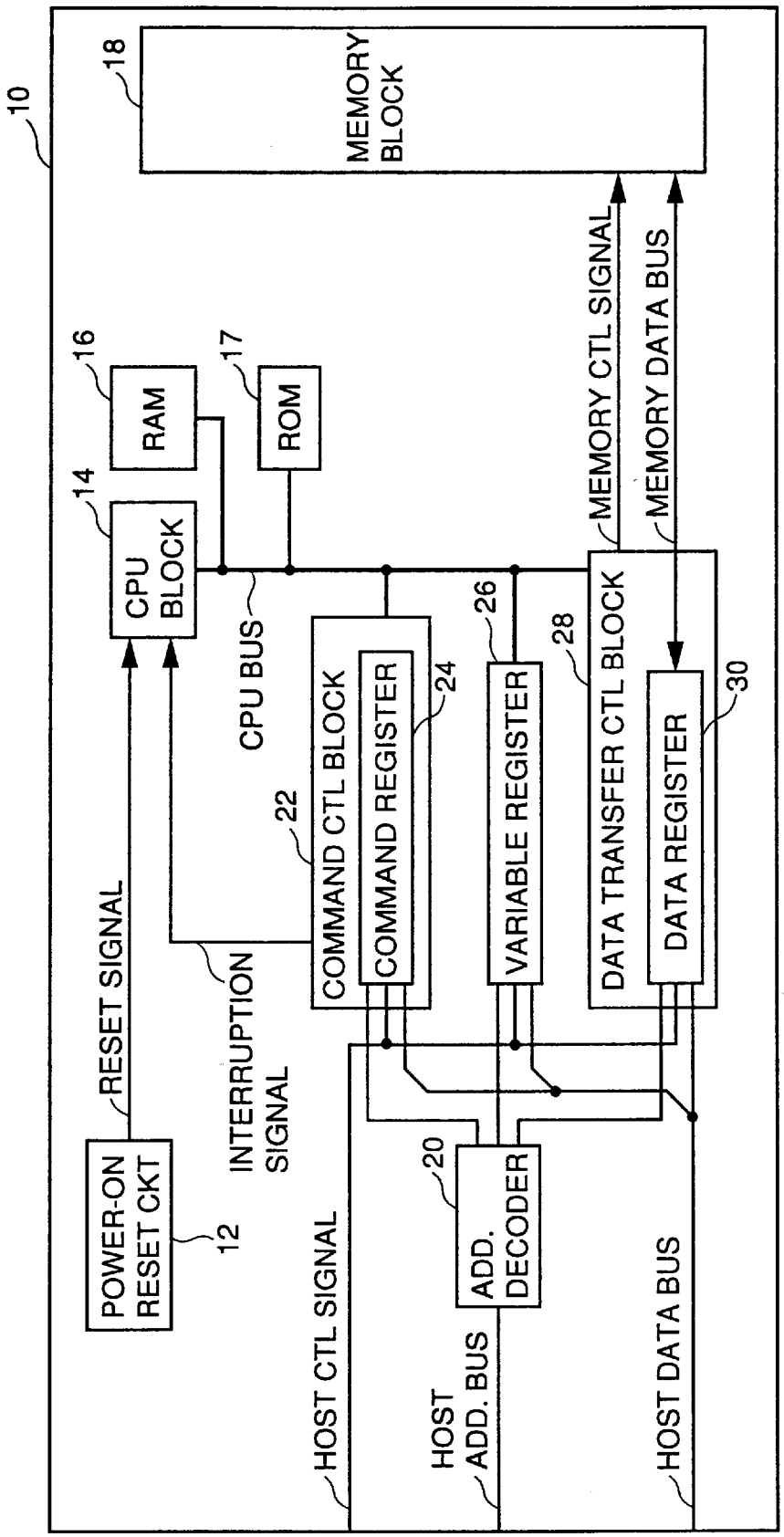
FIG. 2 is a block diagram representing a configuration of a card-type data storage device 10 according to the first embodiment.

Referring to FIG. 2, card-type data storage device 10 includes a memory block 18 for data storage, an address decoder 20 receiving an address data transmitted from terminal device 40 as an input, a command register 24 connected to terminal device 40 and address decoder 20 to receive a command issued from terminal device 40, a command control block 22 outputting an interruption signal when the command is written in command register 24, a variable register 26 connected to terminal device 40 and address decoder 20 to receive a value of a variable output from terminal device 40, a data register 30 connected to terminal device 40 and memory block 18 for holding data to be written to memory block 18 and data read from memory block 18, a data transfer control block 28 connected to memory block 18 to transmit a memory control signal to memory block 18 to control writing and reading data to and from memory block 18, a central processing unit (CPU) block 14 connected to command control block 22, command register 24, variable register 26, data transfer control block 28 and a power-on reset circuit 12 (described later) to operate in response to data held in command register 24 and data held in variable register 26, the interruption signal output from command control block 22 and a reset signal output from power-on reset circuit 12 to control data transfer control block 28, a random access memory (RAM) 16 and a read only memory (ROM) 17 each storing a program executed by CPU block 14 and various data, power-on reset circuit 12 outputting the reset signal when various components of card-type data storage device 10 are powered on, and a CPU bus interconnecting CPU block 14, RAM 16, RAM 17, command register 24, variable register 26 and data transfer control block 28.

Figure 3:
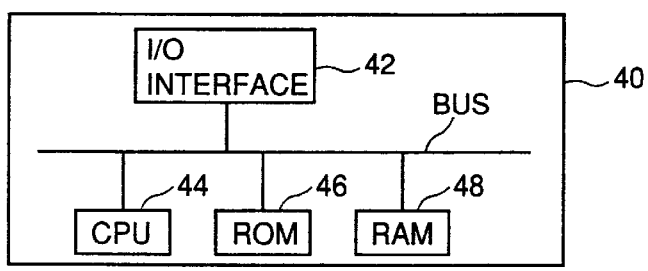
FIG. 3 is a block diagram representing a configuration of a terminal device 40 according to the first embodiment.

Referring to FIG. 3, terminal device 40 includes an input/output (I/O) interface 42 disposed to communicate data with card-type data storage device 10, a CPU 44 performing data communication process, a ROM 46 and a RAM 48 each storing a program executed by CPU 44 and various data, and a bus interconnecting I/O interface 42, CPU 44, ROM 46 and RAM 48.

Between card-type data storage device 10 and terminal device 40, data are transmitted and received as desired after a connection for data transfer has been established therebetween.

Figure 4:
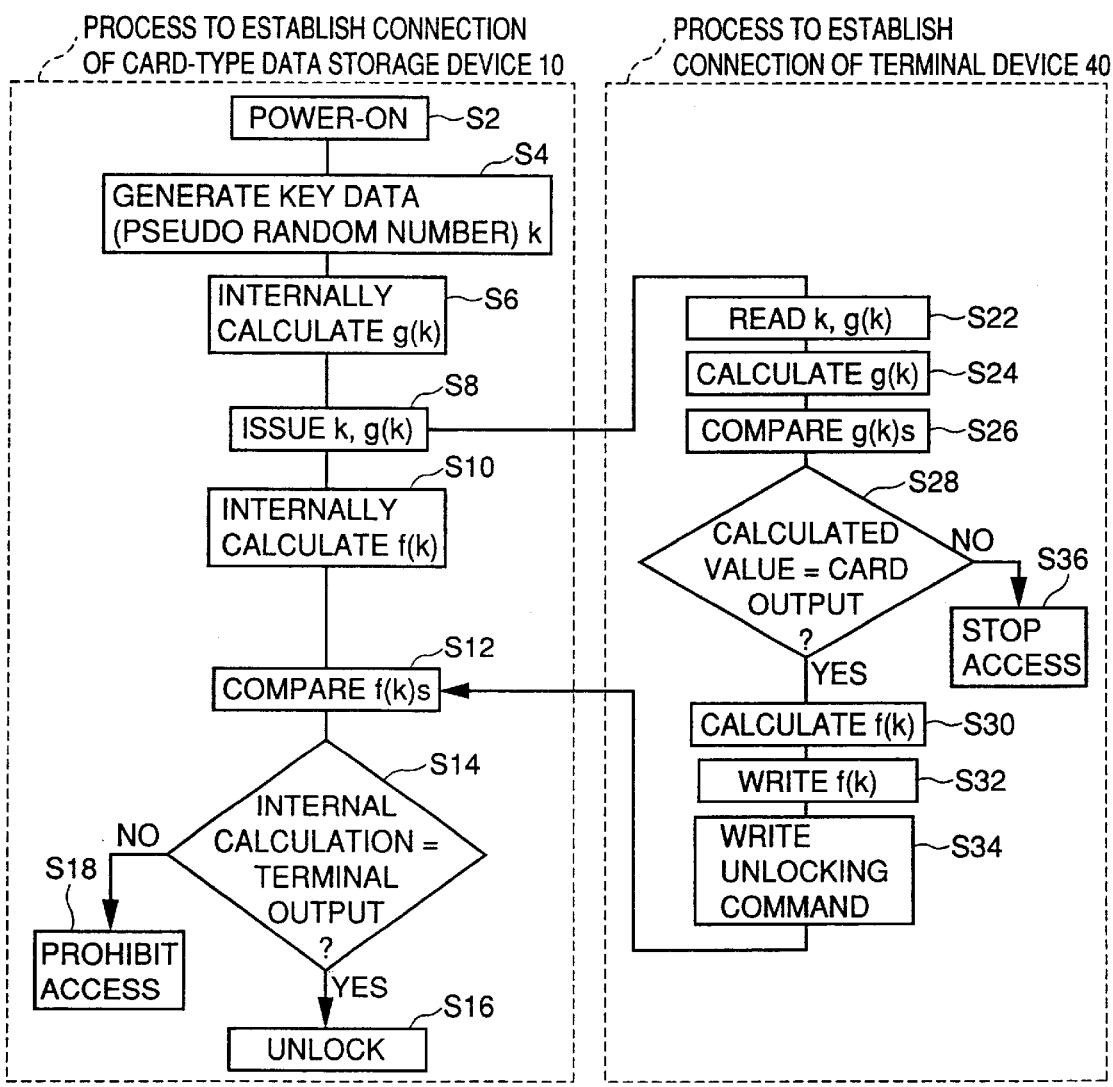
FIG. 4 is a flow chart of a processing performed to establish a connection between card-type data storage device 10 and terminal device 40 according to the first embodiment.

Reference will now be made to FIG. 4 to illustrate a process performed to establish the connection between card-type data storage device 10 and terminal device 40.

When card-type data storage device 10 is mounted to terminal device 40, terminal device 40 supplies power to card-type data storage device 10 and power-on reset circuit 12 outputs the reset signal (S2). In response to the reset signal output from power-on reset circuit 12, CPU block 14 generates a pseudo random number (S4), which is herein adopted as key data k. CPU block 14 uses key data k as an argument to calculate a value g (k) of a predetermined function g (S6). CPU block 14 rearranges each bit of the key data k and value g (k) in accordance with a predetermined rearrangement method and writes it into variable register 26 (S8). CPU block 14 also sets in a status register (not shown) a flag indicating that data has been written in variable register 26. When the flag is set in the status register, a ready signal is output on a signal line (not shown). It should be noted that the respective bit lengths of key data k and value g (k) written into variable register 26 and the method of rearranging each bit thereof are items classified between card-type data storage device 10 and terminal device 40 and are not explicitly disclosed for third parties. CPU block 14 uses key data k as an argument to calculate a value f (k) of a predetermined function f (S10).

CPU 44 of terminal device 40 receives the ready signal via I/O interface 42 and is thus notified that data has written in variable register 26 at the S8 step. Terminal device 40 CPU 44 reads the data written in variable register 26 via I/O interface 42 (S22). CPU 44 extracts key data and value g (k) from the read data and uses key data k as an argument to calculate value g (k) of function g which is identical to that used in the S6 step (S24). CPU 44 compares value g (k) read from variable register 26 with value g (k) calculated by CPU 44 (S26). If the values do not match (NO at S28), CPU 44 stops access to card-type data storage device 10 (S36). If the values match (YES at S28), CPU 44 uses key data k as an argument to calculate value f (k) of function f which is identical to that used in the S10 step (S30). CPU 44 writes value f (k) into variable register 26 (S32) and writes an unlocking command into command register 24 (S34).

When the unlocking command is written into command register 24, command control block 22 generates an interruption signal. In response to the interruption signal, CPU block 14 compares value f (k) calculated by CPU block 14 with value f (k) written into variable register 26 (S12). If the values match, (YES at S14), CPU block 14 permits access from terminal device 40 in the subsequent process (S16). If the values do not match (NO at S14), CPU block 14 prohibits access from terminal device 40 in the subsequent process and locks data storage device 10 (S18). In other words, any access from terminal device 40 is ignored.

Once access from terminal device 40 has been permitted at the S16 step, the process described below is followed to provide data communication between card-type data storage device 10 and terminal device 40, as desired. More specifically, when from terminal device 40 a parameter is set in variable register 26 and a command is written into command register 24, command control block 22 issues an interruption signal to CPU block 14. In response to the interruption signal, CPU block 14 starts processing.

For example, when the command written in command register 24 is a command associated with data transfer, CPU block 14 controls data transfer control block 28 to transfers data. Data transfer control block 28 applies a memory control signal to memory block 18 to allow memory block 18 and data register 30 to write and read data to and from each other. Terminal device 40 writes and reads data to and from memory block 18 and vice versa via data register 30.

The functions f and g described above are each an arithmetic function or a combination of arithmetic functions. Functions f and g may each also be a bit operation for key data k. For example, when key data k is (N+1)-bit data with an i-th bit thereof having a value of ki and value f(k) of function f is (M+1)-bit data with an i-th bit thereof having a value of yi, value f(k) may be calculated in accordance with the following expression (1):

$$f(k) = \begin{pmatrix} G00 & \cdots & G0N \\ \vdots & \ddots & \vdots \\ GM0 & \cdots & GMN \end{pmatrix} \begin{pmatrix} k0 \\ \vdots \\ kN \end{pmatrix} = \begin{pmatrix} y0 \\ \vdots \\ yM \end{pmatrix} \quad (1)$$

It should be noted that Gmn is a predetermined value, wherein m=0 to M and n=0 to N.

As described above, In card-type storage system 8 the data transmitted from a regular card-type data storage device 10 to a regular terminal device 40 is comprised of key data k and value g (k) with each bit rearranged. Furthermore, neither the respective bit lengths of key data k and value g (k) nor the method of rearranging each bit thereof are disclosed. Thus if a third party could improperly steal communication between data storage device 10 and terminal device 40, the third party cannot obtain key data k nor obtain a relationship between key data k and value f (k) of function f. Thus the third party cannot construct a false terminal device 40 which transmits value f (k) of function f corresponding to key data k when key data k is received, nor improperly steal data stored in memory block 18 of card-type data storage device 10.

Furthermore, even if a third party attempts to obtain a relationship between the data comprised of key data k and value g (k) with each bit rearranged and value f (k), the third party cannot obtain the bit length of the rearranged data and the third party can thus not find out the number of possible values of the rearranged data. Thus the third party cannot tell how many combinations of the rearranged data and value f (k) should be extracted and the third party will continue to take data endlessly. Thus the third party cannot obtain function f.

It is also difficult for third parties to estimate function f from a multiple of the rearrange data and values f (k); for the rearrange data of L,l bits and key data k of M bits, for example, wherein L>M, the rearranged data can have $2^L$ values but in effect $2_M$ values. Thus the rearranged data has more values that are in effect not taken (or more singularity). Thus function f can hardly be estimated.

Thus, card-type storage system 8 of the present embodiment can prevent third parties from readily, improperly stealing data stored in card-type data storage device 10, resulting in enhancement of data security.

Second Embodiment

Figure 5:
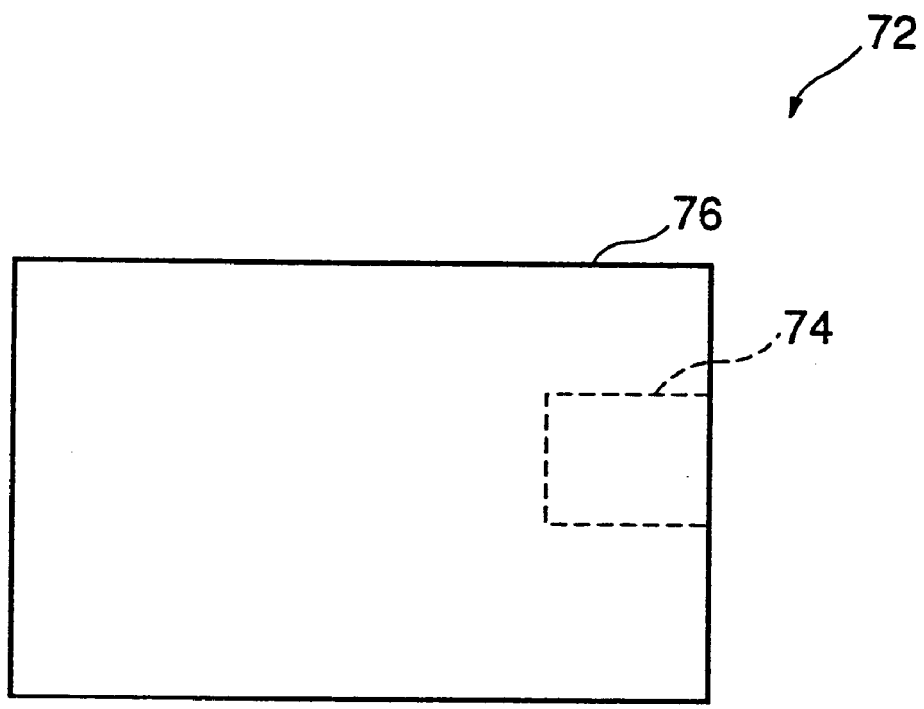
FIG. 5 schematically shows a card-type storage system 72 according to a second embodiment of the present invention.

Referring to FIG. 5, a card-type storage system 72 of the second embodiment is comprised of a terminal device 76 writing and reading data to and from a card-type data storage device 74 (described later) and vice versa, and card-type data storage device 74 mounted internal to terminal device 76 to store data.

Card-type data storage device 74 and terminal device 76 are similar in hardware configuration to the FIGS. 2 and 3 card-type data storage device 10 and terminal device 40, respectively, and will thus not be described in that term.

Figure 6:
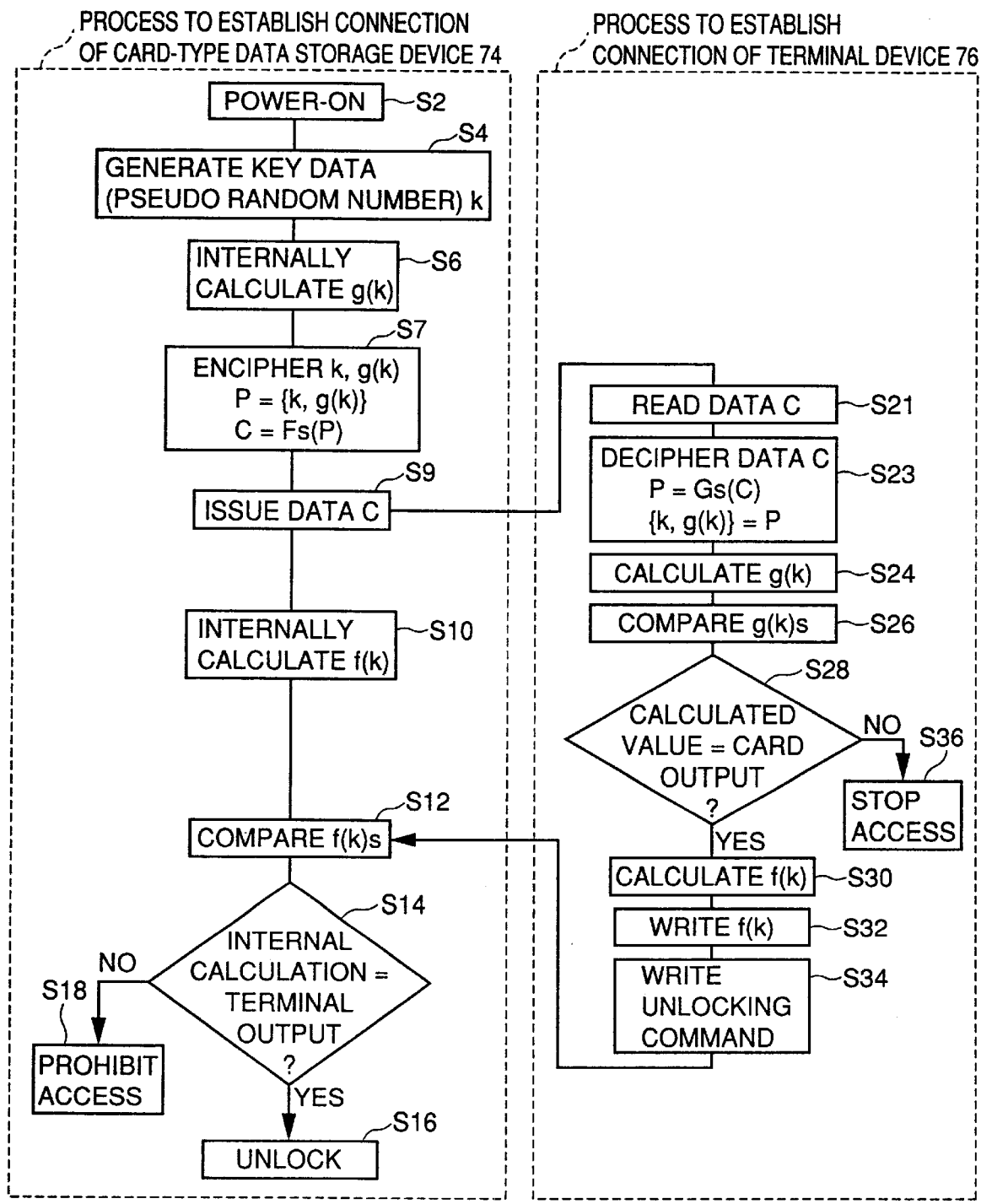
FIG. 6 is a flow chart of a processing performed to establish a connection between a card-type data storage device 74 and a terminal device 76 in accordance with the second embodiment.

Reference will now be made to FIG. 6 to describe a process performed to establish connection between card-type data storage device 74 and terminal device 76.

Card-type data storage device 74 performs the S2–S6 steps. These steps will thus not be described since they are similar to those described with reference to FIG. 4. After the S6 step, CPU block 14 of card-type data storage device 74 applies an enciphering function Fs using a key s to encipher a plain text P comprised of key data k and value g (k) to obtain a cipher text C (S7). CPU block 14 writes cipher text C into variable register 26 (S9). After the S9 step, card-type data storage device 74 performs the S10–16 steps. These steps will not be described since they are similar to those described with reference to FIG. 4.

Cipher text C written into variable register 76 at the S9 step is read by terminal device 76 CPU 44 via I/O interface 42 (S21). CPU 44 uses a deciphering function Gs using the identical key s used in the S7 steps to decipher the read cipher text C to obtain plain text P comprised of key data k and value g (k) (S23). It should be noted that deciphering function Gs is an inverse function of enciphering function Fs. Thereafter, terminal device 76 performs the S24–S36 steps, which will not be described since they are similar to those described with reference to FIG. 4.

In card-type storage system 72 described above, if a third party could improperly steal communication between regular card-type data storage device 74 and regular terminal device 76, the enciphered key data k and value g (k) written in variable register 26 of data storage device 74 can prevent the third party from improperly obtaining the data k and hence a relationship between key data k and value f (k) of function f. Thus the third party cannot construct a false terminal device 76 nor improperly steal data stored in memory block 18 of data storage device 74.

Furthermore, the key data k, value g (k) and enciphered data that have their respective bit lengths undisclosed can prevent a third party improperly attempting to obtain a relationship between the enciphered data and value f (k) from obtaining the number of possible values of the enciphered data, since the third party cannot obtain the bit length of the enciphered data. Thus the third party cannot tell how many combinations of the enciphered data and value f (k) should be extracted and the third party will take data endlessly. Thus the third party cannot obtain function f.

Thus, card-type storage system 72 of the present embodiment can prevent third parties from readily, improperly stealing data stored in card-type data storage device 74, resulting in enhancement of data security.

Third Embodiment

Figure 7:
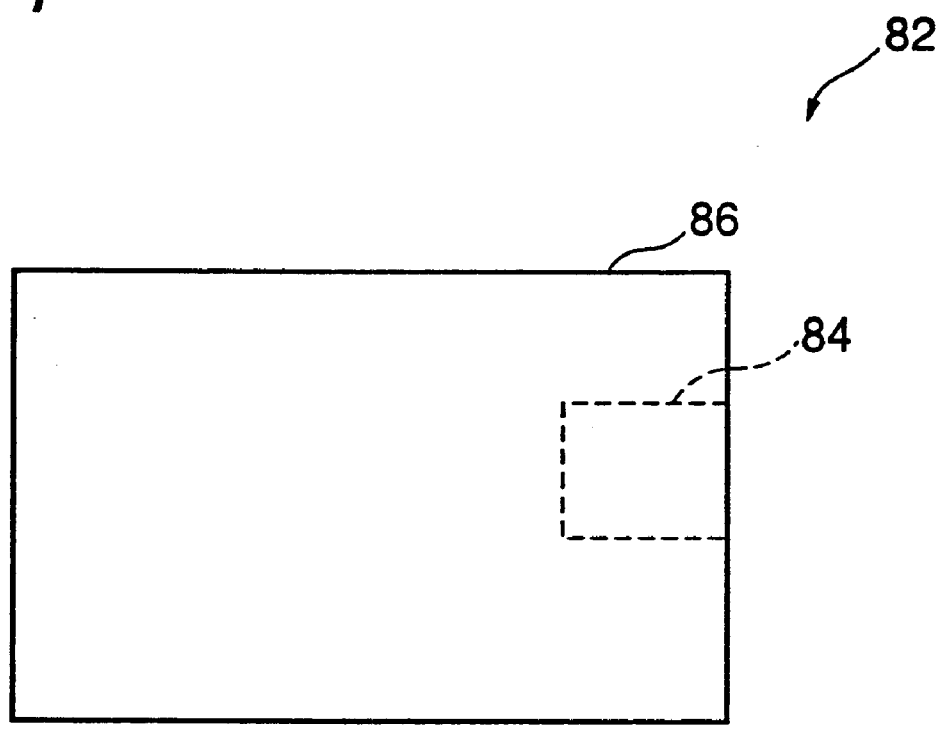
FIG. 7 schematically shows a card-type storage system 82 according to a third embodiment of the present invention.

Referring to FIG. 7, a card-type storage system 82 of the third embodiment includes a terminal device 86 writing and reading data to and from a card-type data storage device 84 (described later) and vice versa, and card-type data storage device 84 mounted internal to terminal device 86 for data storage.

Card-type data storage device 84 and terminal device 86 are similar in hardware configuration to card-type data storage device 10 and terminal device 40 described with reference to FIGS. 2 and 3, respectively, and will thus not be described in that term.

Figure 8:
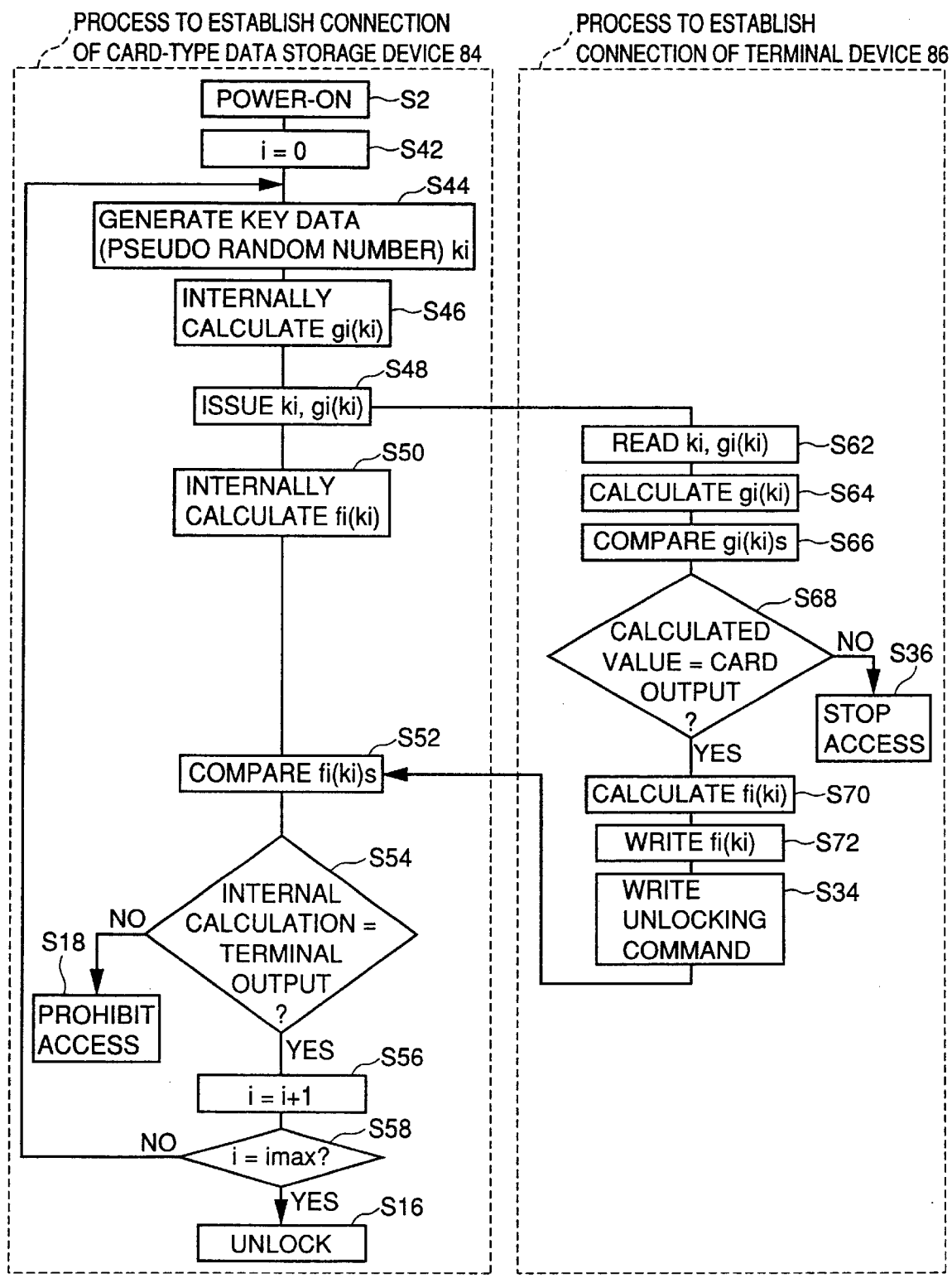
FIG. 8 is a flow chart of a processing performed to establish a connection between a card-type data storage device 84 and a terminal device 86 in accordance with the third embodiment.

Reference will now be made to FIG. 8 to describe a process performed to establish connection between card-type data storage device 84 and terminal device 86.

When card-type data storage device 84 is mounted to terminal device 86, terminal device 86 supplies power to data storage device 84 and power-on reset circuit 12 outputs a reset signal (S2). In response to the reset signal output from power-on reset circuit 12, CPU block 14 sets a counter i to 0 (S42). It should be noted that counter i is adapted to be provided in RAM 16. CPU block 14 generates a pseudo random number (S44). It should be noted that an i-th generated pseudo random number is adopted as key data ki. CPU block 14 uses key data ki as an argument to calculate a value gi (ki) of a predetermined function gi (S46). It should be noted that function gi is provided for each value of counter i. CPU block 14 rearranges each bit of the key data ki and value gi (ki) in accordance with a predetermined rearrangement method and writes it into variable register 26 (S48). CPU 14 also sets in a status register (not shown) a flag indicating that data has been written in variable register 26. When the flag is set in the status register, a ready signal is output on a signal line (not shown). It should be noted that the respective bit lengths of key data ki and value gi (ki) written in variable register 26 and the method of rearranging each bit thereof are items classified between card-type data storage device 84 and terminal device 86 and are not explicitly disclosed for third parties. CPU block 14 uses key data ki as an argument to calculate a value fi (ki) of a predetermined function fi (S50). Function fi is provided for each value of counter i.

CPU 44 of terminal device 86 receives the ready signal and is thus notified that key data ki and value gi (ki) have written in variable register 26 at the S48 step. The data written into variable register 26 is thus read by terminal device 86 CPU 44 via I/O interface 42 (S62). CPU 44 uses read key data ki and an argument to calculate value gi (k) of the identical function gi to that used in the S46 step (S64). It should be noted that RAM 48 in terminal device 86 is provided with counter i, as in card-type data storage device 84. Counter i provided for RAM 48 is incremented by one when CPU 44 reads data via I/O interface 42. Counter i is also adapted to be reset to zero when data storage device 84 is mounted to terminal device 86. CPU 44 compares value gi (ki) read from variable register 26 with value gi (ki) calculated by CPU 44 (S66). If the values do not match (NO at S68), CPU 44 stops access to card-type data storage device 84 (S36). If the values match (YES at S68), CPU 44 uses key data ki as an argument to calculate value fi (ki) of the identical function fi to that used in the S50 step (S70). CPU 44 writes value fi (ki) into variable register 26 (S72) and writes an unlocking command into command register 24 (S34).

When the unlocking command is written in command register 24, command control block 22 generates an interruption signal. In response to the interruption signal, CPU block 14 compares value fi (ki) calculated by CPU block 14 with value fi (ki) written in variable register 26 (S52). If the values do not match (NO at S54), CPU block 14 prohibits access from terminal device 86 in the subsequent process and locks data storage device 84 (S18). In other words, any access from terminal device 86 is ignored in the subsequent process. If the values match (YES at S54), CPU block 14 increments counter i by one (S56). CPU block 14 determines whether counter i has reached a predetermined value imax (S58). If counter i has not yet reached value imax (NO at S58), the process from S44 onwards is repeatedly applied for incremented counter i. If counter i has reached value imax, i.e., if values gi (ki) and fi (ki) compared imax times between data storage device 84 and terminal device 86 match all of the imax times, then card-type data storage device 84 permits access from terminal device 84 in the subsequent process (S16).

In accordance with card-type storage system 82 described above, in addition to the function and effect of card-type storage system 8 of the first embodiment, value gi (ki) and value fi (ki) are compared multiple times and key code ki and functions gi and fi are also varied each time. It is thus extremely difficult for third parties to construct a false terminal device 86 and improperly steal data stored in card-type data storage device 84.

Thus, card-type storage system 82 of the present embodiment can prevent third parties from readily, improperly stealing data stored in card-type data storage device 84, resulting in enhancement of data security.

Fourth Embodiment

Figure 9:
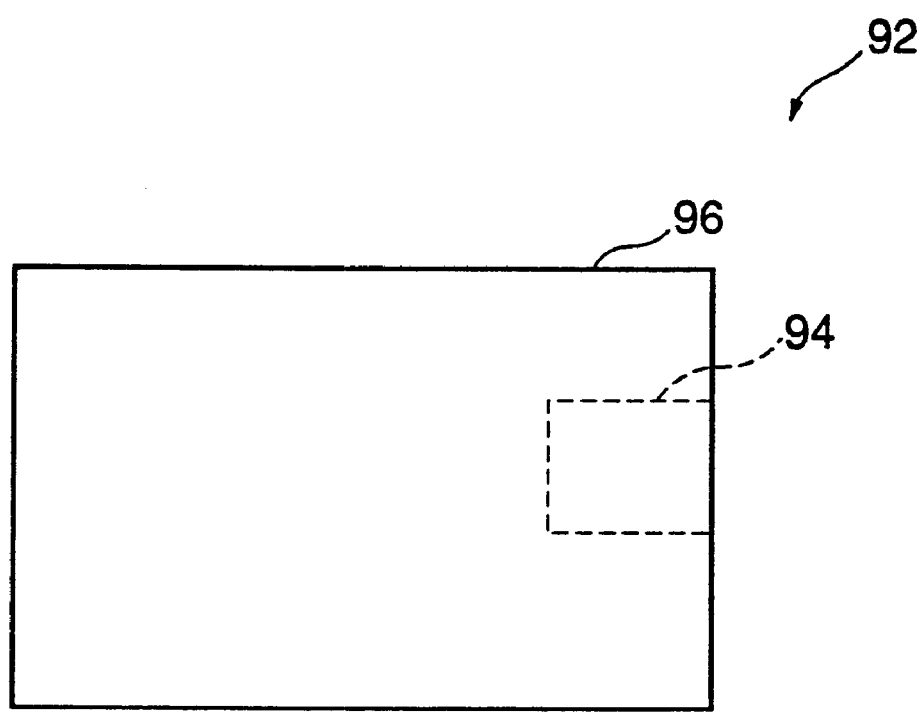
FIG. 9 schematically shows a card-type storage system 92 according to a fourth embodiment of the present invention.

Referring to FIG. 9, a card-type storage system 92 of the fourth embodiment includes a terminal device 96 writing and reading data to and from a card-type data storage device 94 described later and vice versa, and card-type data storage device 94 mounted internal to terminal device 96 for data storage.

Card-type data storage device 94 and terminal device 96 are similar in hardware configuration to card-type data storage device 10 and terminal device 40 described with reference to FIGS. 2 and 3, respectively, and will thus not be described in that term.

Figure 10:
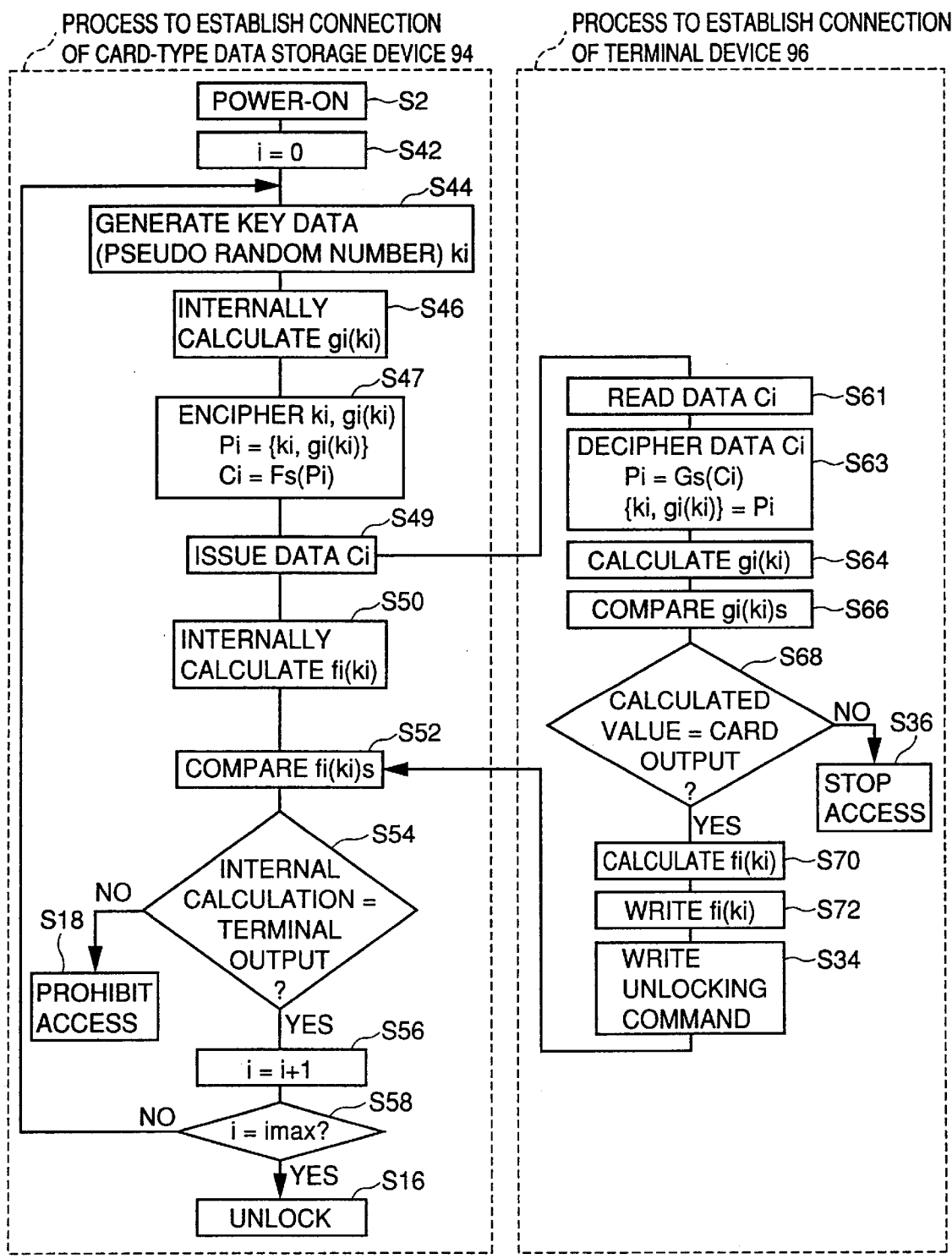
FIG. 10 is a flow chart of a processing performed to establish a connection between a card-type data storage device 94 and a terminal device 96 in accordance with the fourth embodiment.
Figure 11:
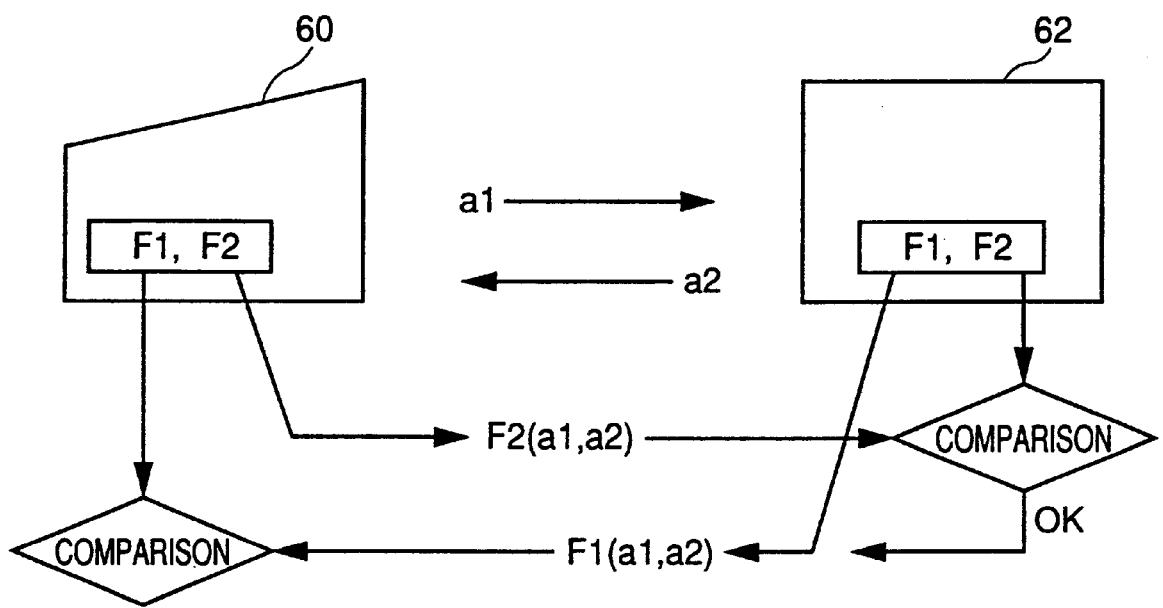
FIG. 11 illustrates a conventional method of virtual authentication between IC card 62 and device 60.

Reference will now be made to FIG. 10 to describe a process performed to establish connection between card-type data storage device 94 and terminal device 96.

Card-type data storage device 94 provides the S2 and S42–S46 steps, which will not be described since they are similar to those described with reference to FIG. 8. After the S46 step, CPU block 14 of data storage device 94 applies enciphering function Fs using key s to encipher a plain text Pi comprised of key data ki and value gi (ki) to obtain a cipher text Ci (S47). CPU block 14 writes cipher text Ci into variable register 26 (S49). After the S49 step, data storage device 94 provides the S50–S58 steps and the S16–S18 steps, which will not be described since they are similar to those described with reference to FIG. 8.

Cipher text Ci written in variable register 26 at the S49 step is thus read by terminal device 96 CPU 44 via I/O interface 42 (S61). CPU 44 uses deciphering function Gs using the identical key s to that used in the S47 step to decipher read cipher text Ci to obtain plain text P comprised of key data ki and value gi (ki) (S63). It should be noted that deciphering function Gs is an inverse function of enciphering function Fs. Thereafter, terminal device 96 provides the S64–S72 steps and the S34–S36 steps, which will not described since they are similar to those described with reference to FIG. 8.

According to card-type storage system 92 described above, in addition to the functional and effect of card-type storage system 72 of the second embodiment, values gi (ki) and fi (ki) are compared multiple times and key code ki and functions gi and fi are varied each time. It is thus extremely difficult for third parties to construct a false terminal device 96 and thereby improperly steal data stored in card-type data storage device 94.

Thus, card-type data storage system 92 of the present embodiment can prevent third parties from readily, improperly stealing data stored in card-type data storage device 94, resulting in enhancement of data security.

Although the above embodiments have been described with respect to card-type storage systems comprised of a card-type data storage device and a terminal device, the above configurations are merely illustrative and any systems are applicable that are comprised of a plurality of processing devices interconnected to implement a predetermined function.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A processing system comprising a data processing device and a data access device interconnected to implement a predetermined function, said data processing device including a data select unit disposed to select data, a first conversion unit connected to said data select unit to convert said selected data in accordance with a predetermined method, a first transmission unit connected to said first conversion unit to transmit said selected data and said converted data generated by said first conversion unit to said data access device, a first reception unit receiving data from said data access device, a second conversion unit connected to said data select unit to convert said selected data in accordance with a predetermined method, and a first operation determining unit connected to said first reception unit and said second conversion unit to compare outputs from said first reception unit and said second conversion unit and responding to a result of comparing the outputs from said first reception unit and said second conversion unit by determining an operation of said data processing device, said data access device including:

a second reception unit connected to said first transmission unit to receive an output from said first transmission unit, a third conversion unit connected to said second reception unit to convert an output from said second reception unit in accordance with a predetermined method, a first comparator unit connected to said second reception unit and said third conversion unit to compare an output from said third conversion unit and data defined by the output from said second reception unit, a fourth conversion unit connected to said second reception unit to convert the output from said second reception unit in accordance with a predetermined method, and a second operation determining unit connected to said first comparator unit and said fourth conversion unit to respond to a result of the comparison by determining an operation of said data access device and transmitting an output from said fourth conversion unit to said data processing device.

2. The processing system according to claim 1, wherein:

said first conversion unit includes a fifth conversion unit connected to said data select unit to convert said selected data in accordance with a first predetermined method, and a sixth conversion unit connected to said data select unit and said fifth conversion unit to convert outputs from said data select unit and said fifth conversion unit in accordance with a predetermined conversion method;

said third conversion unit includes a seventh conversion unit connected to said second reception unit to extract said selected data from the output of said second reception unit and convert said selected data in accordance with said first method; and said first comparator unit includes a second comparator unit connected to said second reception unit and said seventh conversion unit to extract from the output of said second reception unit the data converted in accordance with said first method for comparison with an output from said seventh conversion unit.

3. The processing system according to claim 2, wherein said sixth conversion unit includes a conversion rearrangement unit connected to said data select unit and said fifth conversion unit to rearrange each bit of the outputs from said data select unit and said fifth conversion unit in accordance with a predetermined rearrangement method.

4. The processing system according to claim 2, wherein:

said sixth conversion unit includes an enciphering unit connected to said data select unit and said fifth conversion unit to encipher the outputs from said data select unit and said fifth conversion unit; and said second reception unit includes a reception deciphering unit connected to said first transmission unit to receive and decipher the output from said first transmission unit.

5. The processing system according to claim 1, wherein said first operation determining unit includes a third operation determining unit connected to said first reception unit and said second conversion unit to compare the outputs from said first reception unit and said second conversion unit until a predetermined condition is established and respond to a result of comparing the outputs from said first reception unit and said second conversion unit by determining an operation of said data processing device.

6. The processing system according to claim 5, wherein said first, second, third and fourth conversion units each has a conversion method varying for each conversion.

7. The processing system according to claim 1, wherein said fourth conversion unit includes an extraction conversion unit connected to said second reception unit to extract said selected data from the output of said second reception unit and convert said selected data in accordance with a conversion method identical to the conversion method of said second conversion unit.

8. A data processing device for use in a processing system comprising the data processing device and a data access device interconnected to implement a predetermined function, said data access device including a data access device reception unit configured to receive outputs from said data processing unit; a first data access device conversion unit connected to said data access device reception unit to convert an output from said data access device reception unit in accordance with a predetermined method; a data access device comparator unit connected to said data access device reception unit and said first data access device conversion unit to compare an output from said first data access device conversion unit and data defined by the output from said data access device reception unit; a second data access device conversion unit connected to said data access device reception unit to convert the output from said data access device reception unit in accordance with a predetermined method; and a data access device operation determining unit for determining an operation of said data access device based on a comparison result of said data access device comparator and for controlling transmitting an output from said second data access device conversion unit to said data processing device; said data processing device including:

a data select unit disposed to select data;

a first conversion unit connected to said data select unit to convert said selected data in accordance with a predetermined method;

a transmission unit connected to said first conversion unit to transmit said selected data and said converted data generated by said first conversion unit to said data access device reception unit;

a reception unit receiving data from said second data access device conversion unit;

a second conversion unit connected to said data select unit to convert said selected data in accordance with a predetermined method; and an operation determining unit connected to said reception unit and said second conversion unit to compare outputs from said reception unit and said second conversion unit, and, based on a result of comparing the outputs from said reception unit and said second conversion unit, determining an operation of said data processing device.

9. The data processing device according to claim 8, wherein said first conversion unit includes:
   a third conversion unit connected to said data select unit to convert said selected data in accordance with a first predetermined method; and
   a fourth conversion unit connected to said data select unit and said third conversion unit to convert outputs from said data select unit and said third conversion unit in accordance with a predetermined conversion method.

10. The data processing device according to claim 9, wherein said fourth conversion unit includes a conversion rearrangement unit connected to said data select unit and said third conversion unit to rearrange each bit of the outputs from said data select unit and said third conversion unit in accordance with a predetermined rearrangement method.

11. The data processing device according to claim 9, wherein said fourth conversion unit includes an enciphering unit connected to said data select unit and said third conversion unit to encipher the outputs from said data select unit and said third conversion unit.

12. The data processing device according to claim 8, wherein said first operation determining unit includes a second operation determining unit connected to said first reception unit and said second conversion unit; to compare the outputs from said first reception unit and said second conversion unit until a predetermined condition is established and respond to a result of comparing the outputs from said first reception unit and said second conversion unit by determining an operation of said data processing device.

13. The data processing device according to claim 12, wherein said first and second conversion units each has a conversion method varying for each conversion.

14. A data access device used in a processing system comprising a data processing device and a data access interconnected to implement a predetermined function, said data processing device including a data select unit disposed to select data, a first conversion unit connected to said data select unit to convert said selected data in accordance with a predetermined method, a first transmission unit connected to said first conversion unit to transmit said selected data and said converted data generated by said first conversion unit to said data access device, a first reception unit receiving data from said data access device, a second conversion unit connected to said data select unit to convert said selected data in accordance with a predetermined method, and a first operation determining unit connected to said first reception unit and said second conversion unit to compare outputs from said first reception unit and said second conversion unit and respond to a result of comparing the outputs from said first reception unit and said second conversion unit by determining an operation of said data processing device, said data access device being interconnected to said data processing device to implement a predetermined function, said data access device including:
   a second reception unit connected to said first transmission unit to receive an output from said first transmission unit;
   a third conversion unit connected to said second reception unit to convert an output from said second reception unit in accordance with a predetermined method;
   a first comparator unit connected to said second reception unit and said third conversion unit to compare an output from said third conversion unit and data defined by the output from said second reception unit;
   a fourth conversion unit connected to said second reception unit to convert the output from said second reception unit in accordance with a predetermined method; and
   a second operation determining unit connected to said first comparator unit and said fourth conversion unit to respond to a result of the comparison by determining an operation of said data access device and transmitting an output from said fourth conversion unit to said data processing device.

15. The data access device according to claim 14, wherein:
   said first conversion unit includes
      a fifth conversion unit connected to said data select unit to convert said selected data in accordance with a first predetermined method, and
      a sixth conversion unit connected to said data select unit and said fifth conversion unit to convert outputs from said data select unit and said fifth conversion unit in accordance with a predetermined conversion method;
   said third conversion unit includes a seventh conversion unit connected to said second reception unit to extract said selected data from the output of said second reception unit and convert said selected data in accordance with said first method; and
   said first comparator unit includes a second comparator unit connected to said second reception unit and said seventh conversion unit to extract from the output of said second reception unit the data converted in accordance with said first method for comparison with an output from said seventh conversion unit.

16. The data access device according to claim 15, wherein:
   said sixth conversion unit includes an enciphering unit connected to said data select unit and said fifth conversion unit to encipher the outputs from said data select unit and said fifth conversion unit; and
   said second reception unit includes a reception deciphering unit connected to said data processing device to receive and decipher enciphered data output from said data processing device.

17. A method for verifying communication between a first device and a second device, wherein a first function and second function are known to both of the devices, the method comprising the machine-implemented steps of:
   generating a random number;
   generating a first function value based on the random number and the first function known to the first device;
   transmitting the random number and the first function value to the second device;
   generating a second function value based on the random number and the second function known to the first device;
   receiving a third function value from the second device;
   comparing the second function value and the third function value; and
   validating communications between the first device and the second device based on a result of the comparing step;
   the second device generating the third function value in the computer-implemented steps of:
      generating a fourth function value based on the received random number and the first function known to the second device;

comparing the fourth function value with the received first function value;

generating the third function value based on the received random number and the second function known to the second device; and transmitting the third function value to the first device.

* * * * *